(No Model.) 4 Sheets—Sheet 1.
T. KIRK & C. H. HORTON.
BRICK MACHINE.
No. 409,593. Patented Aug. 20, 1889.
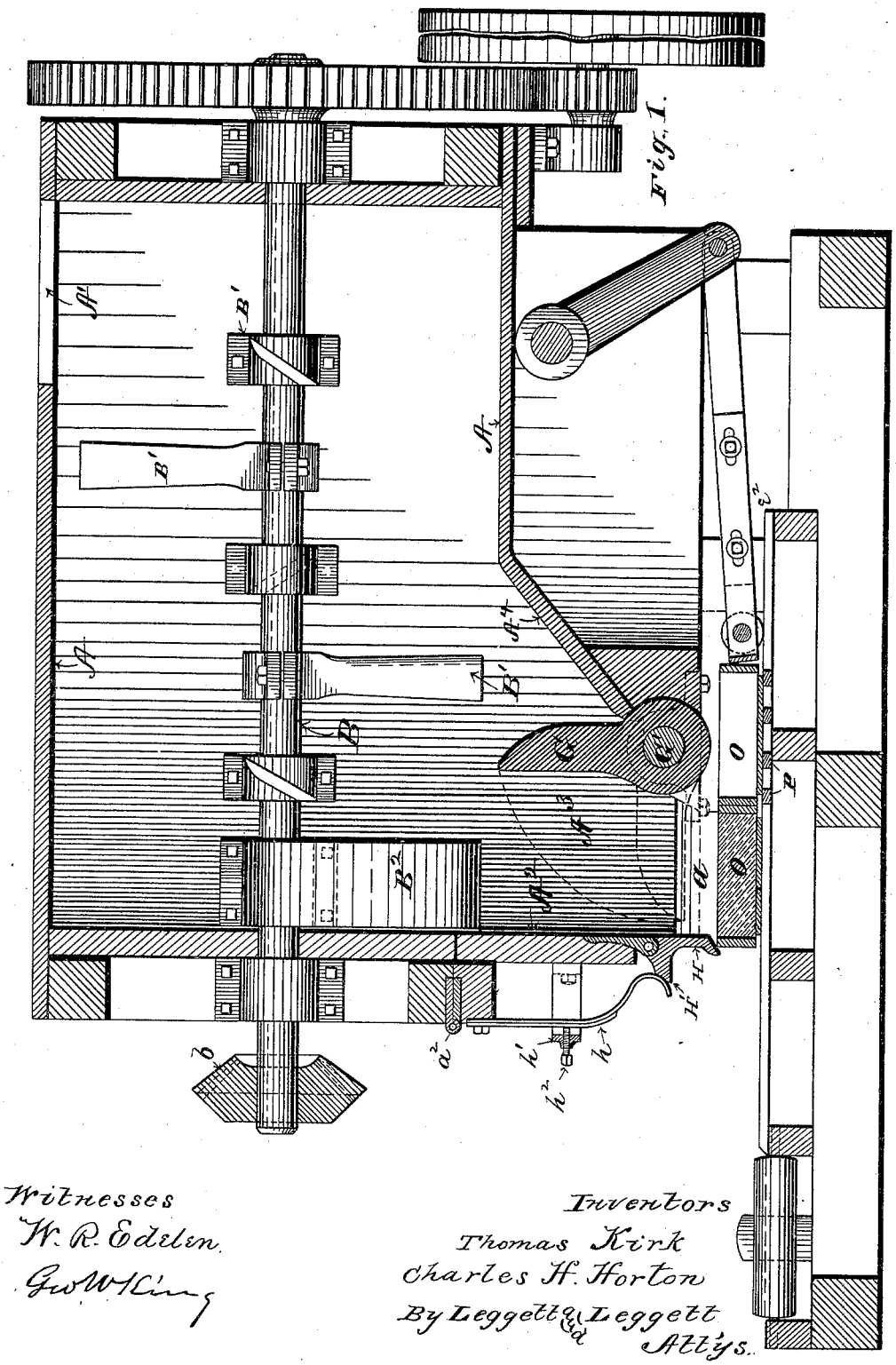

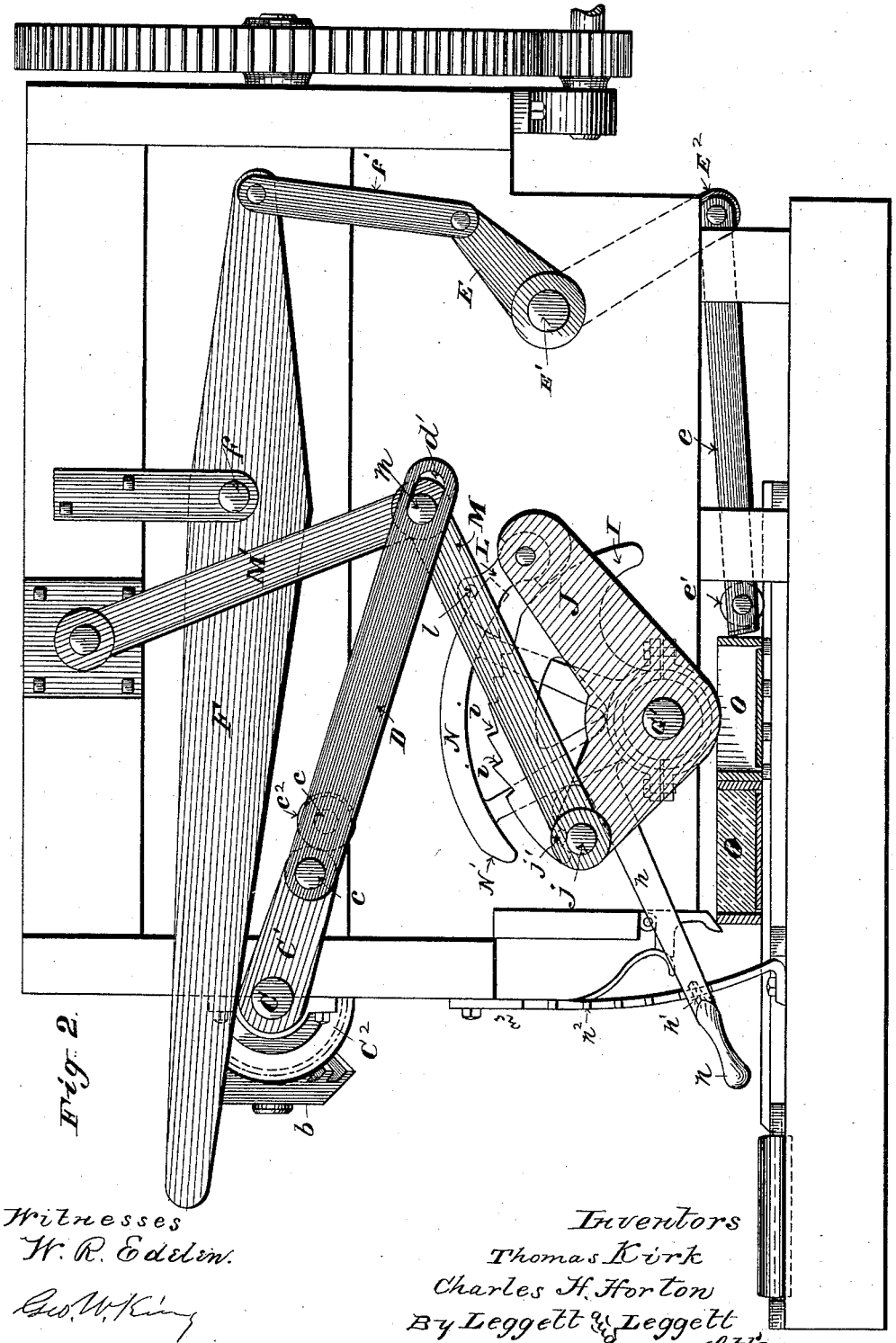

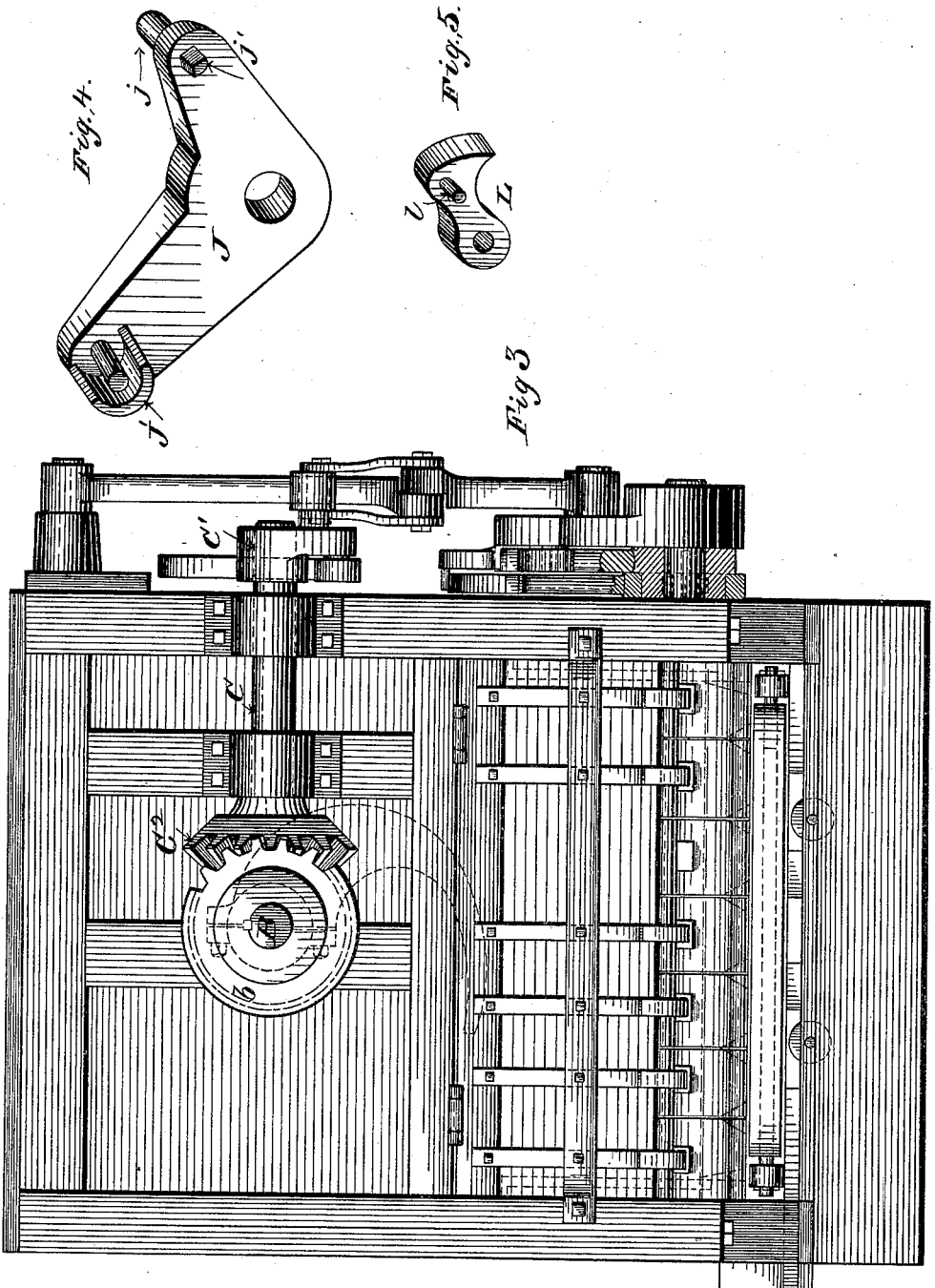

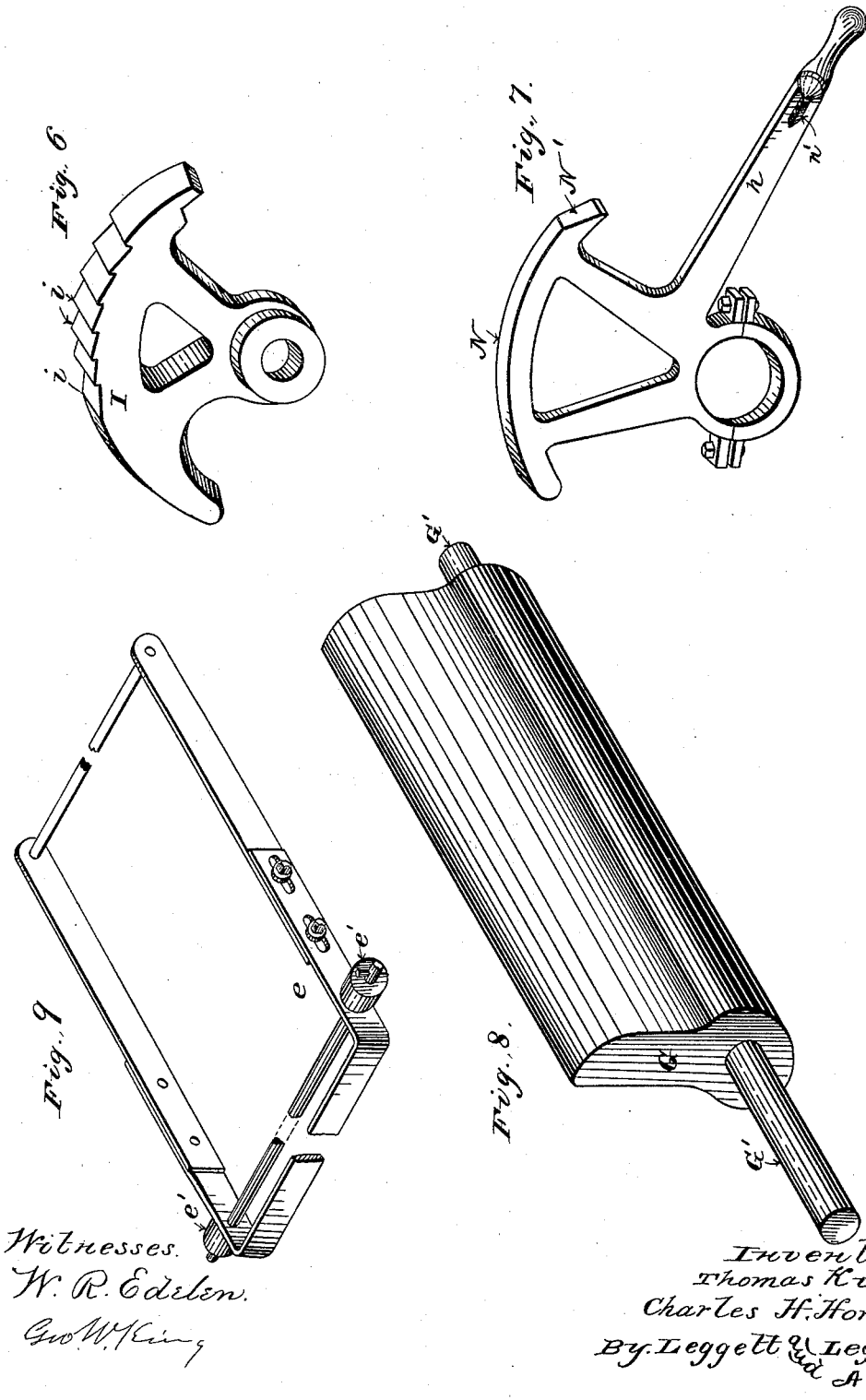

UNITED STATES PATENT OFFICE.

THOMAS KIRK AND CHARLES H. HORTON, OF WELLINGTON, OHIO, ASSIGNORS TO BENNETT BROTHERS & COMPANY, OF SAME PLACE.

BRICK-MACHINE.

SPECIFICATION forming part of Letters Patent No. 409,593, dated August 20, 1889.

Application filed February 28, 1889. Serial No. 301,456. (No model.)

*To all whom it may concern:*

Be it known that we, THOMAS KIRK and CHARLES H. HORTON, of Wellington, in the county of Lorain and State of Ohio, have invented certain new and useful Improvements in Brick-Machines; and we do hereby declare the following to be a full, clear, and exact description of the invention, such as will enable others skilled in the art to which it pertains to make and use the same.

Our invention relates to improvements in brick-machines for working soft materials, and usually known as "soft-mud machines;" and it consists in certain features of construction and in combination of parts, hereinafter described, and pointed out in the claims.

In the accompanying drawings, Figures 1 and 2 are side elevations, the former being in section. Fig. 3 is a front end elevation. Figs. 4, 5, 6, 7, 8, and 9 are views in perspective in detail.

A represents a horizontal pugging-box, having a feed opening or hopper at A', and having attached a compression-box $A^2$, inclosing a compression-chamber $A^3$, the compression-box being located below the front end of the pugging-box and opening into the latter, the rear wall $A^4$ of the compression-box sloping upward and rearward to join the bottom wall of the pugging-box approximately as shown.

B is the pugging-shaft, the same extending centrally through the pugging-box and having mounted thereon a series of blades B', set oblique to the line of the shaft for tempering and forcing the clay toward the front end of the pugging-box. On shaft B, and near the forward end of the pugging-box, is also mounted a so-called "wiper-arm" $B^2$, the same consisting of a broad curved blade adapted to force the material down into the compression-chamber.

At the right hand in Fig. 1 is shown suitable gearing for propelling shaft B, the pugging-shaft and driving mechanism being of ordinary construction. At the front end, and on the outside of the pugging-box, shaft B is provided with beveled gear $b$, the latter engaging gear $C^2$ of the lateral crank-shaft C, this shaft having mounted thereon crank C', a wrist whereof $c'$ connects with pitman D for operating the toggle-joint, hereinafter mentioned. On a wrist $c$ of this crank-arm is mounted a roller $c^2$ for operating the walking-beam F, the return-stroke of the walking-beam being effected by gravity. The walking-beam is fulcrumed at $f$, and the rear end thereof is connected by means of link $f'$ with rock-arm E, the latter being mounted on rock-shaft E'. Connected with this rock-shaft are two depending rock-arms $E^2$, that are pivotally connected with the mold-pusher $e$, hereinafter mentioned. At the bottom of the compression-chamber are placed a series of V-shaped cross-bars $a$, the aggregation of cross-bars being sometimes called a "grate." The apices of these bars present upward, and the cross-bars are located, respectively, over the partitions of the mold, by means of which the material is divided to facilitate its entering the different mold-compartments. The front wall A' of the compression-box is hinged at $a^2$, so that it may be swung outward to give access for cleaning, repairs, &c., member A' being secured in its closed position by means of bolts or other suitable securing device. To the lower edge of member A' is hinged a series of depending so-called "scraper-doors" H, the function of which is to strike off the molds. Doors H are respectively yieldingly held in position closed by means of springs $h$, these springs being curved rearward, substantially as shown, and the free ends thereof engaging, respectively, the rounded ends of lugs H' of the respective doors H. A bail $h'$ extends in front of the springs, with adjusting-screws $h^2$ connected with the bail and engaging the respective springs for giving tension to the latter. With such construction, if stones or other hard substance protrude above the face of the mold, the door H opposite such obstruction will yield outward, whereby such stones or foreign substance are discharged without doing any harm. If the obstruction is small, so that the scraper-door is only opened a short distance, the recoil of the engaging-spring will return the door to its closed position. If, however, the obstruction is of large size, forcing the door some distance outward, lug H' is thereby elevated so far as to be disengaged from the opposing spring, after which there is little or no resistance in swinging the scraper-door wide open, and after which the scraper-door has to be closed by hand, the opposing spring being of course snubbed back in closing the door.

The press for forcing the material into the mold is as follows: G is an oscillating head or so-called "press" mounted on and rigidly secured to lateral shaft G'. This shaft extends through suitable holes in the side walls of the compression-box, the head G being wholly inside the compression-box and operating in the compression-chamber.

The mechanism for operating head G is as follows: On rock-shaft G' and on the outside of the compression-box is rigidly mounted sector I, the same having ratchet-teeth $i$ on the periphery thereof presenting rearward, the intervals from tooth to tooth being preferably graduated, as shown in Figs. 2 and 6, the smaller teeth or intervals commencing at the right hand or rear end thereof.

J is a lever of the bell-crank variety, the same being journaled on shaft G' and located by the side of sector I. To the rearward arm of this lever is pivotally attached dog L for engaging ratchet-teeth $i$, this arm of the lever being provided with a curved seat adapted to receive the rear end of the dog whereby the pivotal pin or bolt of the dog is relieved of excessive strain. To the other forward arm of lever J is attached a lateral wrist $j$, to which latter is attached arm M, the two arms M and M' constituting a toggle operated by pitman D aforesaid. The forward arm of lever J has a laterally-projecting lug $j'$ for engaging the forward end of sector I for reversing the latter.

N is a segmental rest for engaging lateral pins $l$ of dog L, whereby the dog is held elevated and disengaged from the teeth of the sector. This rest has a smooth periphery adapted for pin $l$ to slide on, and the forward end of this rest terminates in an incline N' presenting forward and inclining downward. This rest device is mounted loosely on shaft G' by the side of sector I and on the opposite end thereof from lever J. Rest N is integral or connected with lever $n$ for turning the rest on its axis forward and rearward by hand, lever $n$ having some suitable device for holding it in different positions—such, for instance, as a V-shaped tooth $n'$ for engaging notches $n^2$ of a stationary bar $n^3$. It requires but little force to hold the hand-lever in position, and either bar $n^3$ or the hand-lever has sufficient elasticity to snub back easily in shifting the hand-lever. Crank C' has considerably more throw than is required to operate the toggle, and hence pitman D has elongated holes $d'$, in which the pivotal pins $m$ of the toggles operate, by means of which the toggles at the extremes of their movements remain at rest for a time, while crank C' is moving away from the dead-centers far enough to take up the lost motion of the pitman. Head G and sector I being, as aforesaid, mounted on and keyed fast to the same shaft, these members must move in unison, and in operating the machine suppose hand-lever $n$ to have been elevated so far as to move rest N rearward out of the way of the dog, in which case the dog will engage the rear tooth of the sector, whereupon by the action of the toggle, lever J, sector, and dog head G is turned on its axis until the forward face thereof is approximately in a horizontal position for pressing the clay into the mold, and on the rearward movement of lever J lug $j'$ aforesaid will engage the forward end of sector I and move the latter rearward, thus returning head G to its upright position or place of beginning. Under such conditions head G makes a full stroke down and back with each revolution of crank C', head G remaining at rest for a time in its elevated position, thereby giving plenty of time for the material to accumulate in the compression-chamber, the head also resting for a time in its depressed position, during which latter time the molds are shifted. If the material is stiff and obstinate, it may require the full stroke of head G to force the material into the molds; but if the material is soft it may be readily forced into the molds by depressing head G part way of its throw. In the latter case lever $n$ is depressed part way to bring rest N opposite one, two, or more of the rearward teeth $i$. In such position of parts, with the reverse movement of lever J pin $l$ engages and mounts incline N', thus lifting the dog from the teeth, and on the next forward movement of the dog it can only engage the sector-teeth when pin $l$ shall have traveled down the incline, and hence the dog rides over the rearward portion of the sector, and consequently only depresses head G part way of its throw. Lever $n$ is therefore shifted from time to time to meet the requirements of the case, thereby giving more or less pressure on the material, according as the latter is stiff or soft. Sometimes, for instance, in starting the machine it is desirable to run the pugging-shaft for a time to properly temper the material before the material is forced into the mold. In such case lever $n$ is depressed its full throw, thereby moving rest N so far forward that the dog is held elevated from the sector during its full throw, and consequently head G remains idle in its elevated position. If the rest were moved forward to elevate the dog while head G was in its depressed position, lug $j'$ would still return the head to its elevated position, after which it would remain at rest until hand-lever $n$ was again elevated. In regard to the graduation of the sector-teeth before reverted to it is evident that when head G commences its advance or forward movement it will move some little distance without causing much down-pressure on the material, and that the down-pressure will greatly increase as the head approximates a horizontal position, and hence the dog in skipping one of the finer or rearward teeth of the sector will cause as much or more variation of pressure as would be caused by skipping one of the coarser or forward teeth of the sector.

The mold-pusher $e$ may be a simple frame, substantially as shown, with rollers $e'$ located on the sides and near the front end of the mold-pusher for supporting the forward end of the latter, these rollers traveling on ways $e^2$.

The molds O are fed in from the side of the machine by hand onto cross-bars P, and from thence are forced forward by the mold-pusher onto table underneath the grate of the compression-box in place to be filled, the empty molds displacing the molds that are filled.

What we claim is—

1. In a brick-machine, the combination, with compression-box and oscillating head operating in the compression-box, substantially as indicated, of toothed sector mounted on the trunnion or axial shaft of the oscillating head, a dog for operating the sector, a vibrating lever for operating the dog, and a movable rest or trip adapted to disengage the dog from the sector during a part or the whole of the throw, according to the position of the rest, substantially as set forth.

2. In a brick-machine, the combination, with compression-box and oscillating head operating therein, and toothed sector for operating the heads, substantially as indicated, of a vibrating lever bearing a dog for engaging such sector in advancing the latter, such vibrating lever having a lug or projecting member for engaging the sector in reversing the latter, substantially as set forth.

3. In a brick-machine, the combination, with oscillating head, toothed sector rigidly mounted on the axial shaft of the oscillating head, and a vibrating lever and oscillating rest or trip journaled on such shaft, the lever having a dog for engaging the sector, the rest having an incline for disengaging the dog from the sector, of a hand-lever for shifting the rest, whereby the dog is held disengaged from the sector more or less of its throw, according to the position of the rest, substantially as set forth.

4. In a brick-machine, the combination, with compression-box, oscillating head, toothed sector, vibrating lever, and dog, substantially as indicated, of toggle for operating the vibrating lever, and a pitman for operating the toggle, such pitman having lost motion, whereby the oscillating head is operated intermittently, substantially as set forth.

In testimony whereof we sign this specification, in the presence of two witnesses, this 13th day of February, 1889.

THOMAS KIRK.
CHARLES H. HORTON.

Witnesses:
EDWIN CLARK,
R. N. GOODWIN.